J. FRIEDLAND.
SAFETY RECEIVING BOX.
APPLICATION FILED OCT. 2, 1917.

1,307,352.

Patented June 24, 1919.

Inventor
Joseph Friedland
By his Attorney
W. T. Curwell

UNITED STATES PATENT OFFICE.

JOSEPH FRIEDLAND, OF BROOKLYN, NEW YORK.

SAFETY RECEIVING-BOX.

1,307,352.　　　　　　Specification of Letters Patent.　　Patented June 24, 1919.

Application filed October 2, 1917. Serial No. 194,338.

*To all whom it may concern:*

Be it known that I, JOSEPH FRIEDLAND, a citizen of the United States, and a resident of New York, borough of Brooklyn, county of Kings, and State of New York, have invented certain new and useful Improvements in Safety Receiving-Boxes, of which the following is a full, clear, and exact specification.

This invention relates more particularly to an improvement on the form of the box disclosed in my application, serially numbered 147,852, filed February 10, 1917, now Patent Number 1,266,077, dated May 14, 1918, and has for its object primarily to provide a container designed to be employed outside of a home for permitting food products and other articles when delivered to be placed therein for safe keeping without requiring the occupants to be notified, and which is of a self-locking type. This is accomplished mainly by providing a casing having one or more separate compartments each with an entrance, and slidable inwardly and outwardly of the casing may be one or a plurality of door members for opening and closing each entrance. Also on each door of the casing is a catch, and removable on the casing is a retaining element adapted to be releasably engaged by all the catches whereby the doors will be locked when closed.

A further object of the invention is to provide a receiving box of a simple, efficient and durable construction which may be made in any desired shape and size.

With these and other objects in view, the invention will be hereinafter more fully described with reference to the accompanying drawing forming a part of this specification in which similar characters of reference indicate corresponding parts in all the views, and will then be pointed out in the claims at the end of the description.

Figure 1:
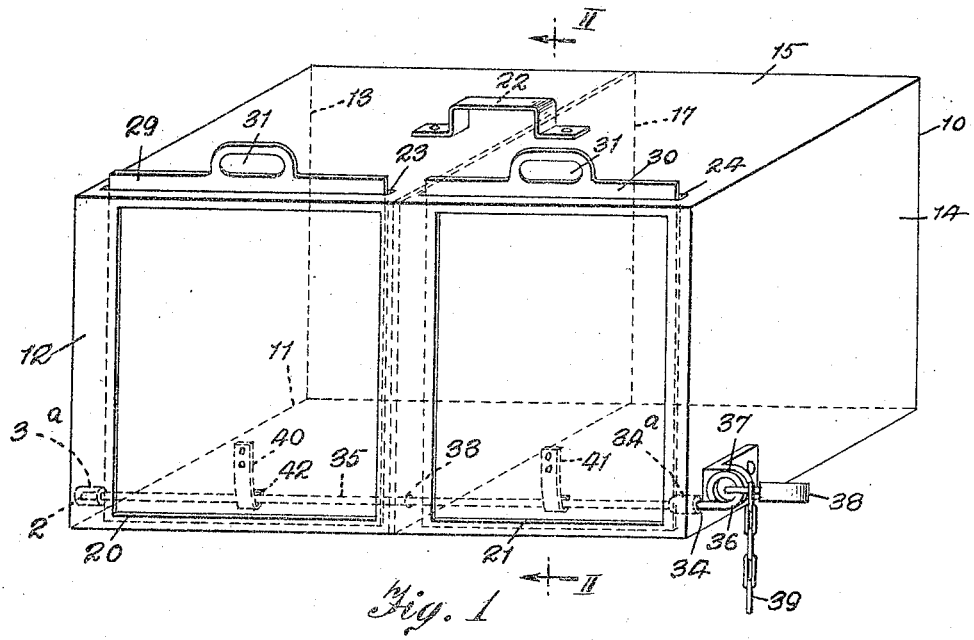
Figure 2:
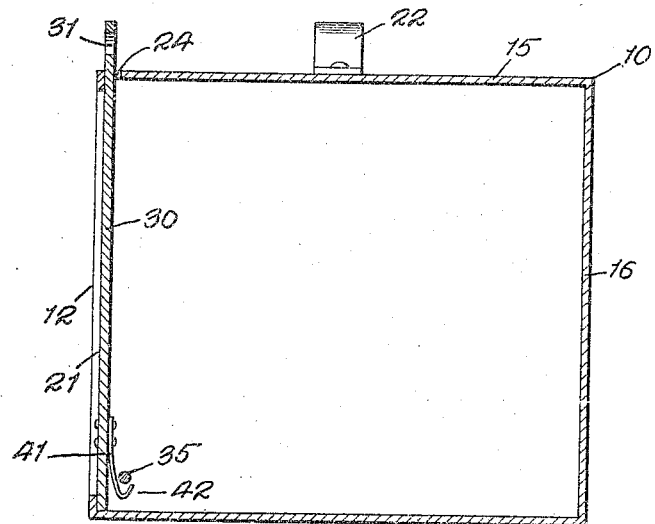

In the drawing, Figure 1 is a perspective view of one form of safety receiving box embodying my invention, and Fig. 2 is a detail sectional view taken on the line II—II of Fig. 1.

The receiving box has a casing 10 which may be of any desired shape and size, though the casing is preferably substantially rectangular to provide a bottom 11, front wall 12, end walls 13 and 14, top wall 15 and a rear wall 16. Extending from the front wall to the rear wall interiorly of the casing is a partition 17 which divides the casing into two compartments and in the front wall may be a number of openings 20 and 21 each providing an entrance leading into one of the compartments so that food products and other articles may be placed in the compartments, it being understood that forms of the box may be made wherein the casing has only one compartment with a single entrance. On the top of the casing may be provided a handle, as 22, to allow the box to be readily carried by a person when removal from place to place is desired.

In the top wall of the casing 10 is an elongated slot 23 provided adjacent to the front wall of the casing over the entrance 20, and also in the top wall is another similar elongated slot 24 arranged adjacent to the front wall over the entrance 21 of the casing. Each of the slots 23 and 24 is of a length substantially equal to the width of each compartment of the casing.

Adapted to close and open the entrance of the compartments of the casing are door members 29 and 30. These door members are preferably in the forms of plates one disposed through each of the slots 23 and 24. Both of the door members are of sizes to slidably fit closely in the slots as well as being freely movable in the casing besides being of lengths so that their upper ends extend some distance above the casing, and in the central part of the protruding end of each door member may be an opening 31 to allow the doors to be easily guided to open and closed positions in the casing.

In the end walls 13 and 14 as well as in the partition 17 of the casing are registered orifices 32, 33, 34 which are arranged so as to be in proximity to the inner faces of the door members at their lower ends, and on the end walls of the casing surrounding the orifices 32 and 34 may be short sleeves $32^a$ and $34^a$ protruding toward the partition 17. Through these orifices and sleeves is removably disposed a retaining element, as 35. The retaining element 35 is preferably in the form of a rod of a length so that one of its ends extends beyond one of the end walls of the casing, and this protruding end of the rod terminates with a ring, or eye 36. Also protruding from the casing adjacent to the eye 36 is a fixed eye, as 37, which is in register with the eye of the rod so that a padlock, as 38, or other form of lock may be used to fasten the eye of the rod and the fixed eye 37 of the casing together for releasably locking the rod in the casing as well as permitting the receiving box to be attached to a suitable support by means of a line, or chain, as 39, to which the padlock is fastened.

In order to allow the slidable door members to be releasably locked when guided inwardly of the casing, for closing the entrances 20 and 21, on the inside faces of the door members are provided catches, as 40 and 41. The catches 40 and 41 may be similarly formed, besides being of any well known or preferred types, though each catch is preferably made of a strip of spring metal having its lower end fashioned in the shape of a hook, as at 42. The upper ends of these catches are bolted, or otherwise secured to the door members so that their lower parts together with the hooks will be slightly spaced from the door members, and these catches are also arranged whereby the hooks will pass under besides being sprung partially around the rod, or retaining element 35 when the door members are moved to close the entrances of the casing.

To employ the box for safely receiving articles when delivered to a home without requiring the occupants to be notified, the door members 29 and 30 are guided outwardly of the casing above its top wall for opening the entrances 20 and 21 so that articles may be placed in one or both of the compartments of the casing. The rod 35 is also locked to the eye 37 of the casing by means of the padlock, while the chain of the padlock may be secured to a support exteriorly of the home to prevent the box from being surreptitiously taken. When articles are placed in one or both of the compartments of the casing the door member of each compartment is forced inwardly of the casing, and when moved to closed positions before the entrances of the casing the catches will engage the rod 35, as above explained to releasably lock the doors. In order to permit the articles in the compartments to be removed the padlock 38 is unlocked and removed from the eyes of the casing and retaining rod, after which the rod is withdrawn from the orifices in the casing. The catches 40 and 41 will then be released to allow the door members to be opened so that the articles in the compartments may be removed. Thus a simple and efficient box or container is provided for use outside of a home whereby food products and other articles when delivered may be placed therein for safe keeping.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

The combination, in a safety receiving box, with a substantially rectangular casing having compartments each with an entrance through one of the side walls of the casing, including doors slidable inwardly and outwardly of the casing, one at each entrance, and the casing having through its ends registered orifices adjacent to the inner surfaces of the doors, of a rod removably disposed in the registered orifices registered eyes one on the rod and one on the casing for reception of a separate lock to hold the rod in the casing, and a spring hook on each door, adapted to releasably engage the rod to lock the door when closed as well as to allow disengagement of all the hooks with the rod when the rod is withdrawn from the orifices of the casing.

This specification signed and witnessed this 1st day of October, A. D. 1917.

JOSEPH FRIEDLAND.

Witnesses:
E. W. JONES,
V. M. RUMPH.